United States Patent
Gan et al.

(10) Patent No.: US 10,355,777 B2
(45) Date of Patent: Jul. 16, 2019

(54) ADAPTIVE BEAM AGGREGATION AND SPLIT TRANSCEIVER IN UNMANNED VEHICLES

(71) Applicant: Facebook, Inc., Menlo Park, CA (US)

(72) Inventors: Hong Gan, San Diego, CA (US); Matthew Stoneback, Menlo Park, CA (US); Wilhelmus Hendrikus Theunissen, Belmont, CA (US); Michael Tseytlin, Bethesda, MD (US); Raymond R. Blasing, Los Altos, CA (US); Gordon Michael Coutts, Santa Clara, CA (US); Sam Padinjaremannil Alex, Sunnyvale, CA (US)

(73) Assignee: Facebook, Inc., Menlo Park, CA (US)

(*) Notice: Subject to any disclaimer, the term of this patent is extended or adjusted under 35 U.S.C. 154(b) by 0 days.

(21) Appl. No.: 15/679,071

(22) Filed: Aug. 16, 2017

(65) Prior Publication Data
US 2018/0054252 A1   Feb. 22, 2018

Related U.S. Application Data

(60) Provisional application No. 62/376,229, filed on Aug. 17, 2016.

(51) Int. Cl.
| | |
|---|---|
| *H04W 4/00* | (2018.01) |
| *H04B 7/185* | (2006.01) |
| *H04W 72/04* | (2009.01) |
| *H04B 7/06* | (2006.01) |
| *H04B 1/40* | (2015.01) |

(52) U.S. Cl.
CPC ....... *H04B 7/18578* (2013.01); *H04B 7/0617* (2013.01); *H04B 7/18502* (2013.01); *H04W 72/046* (2013.01); *H04B 1/40* (2013.01)

(58) Field of Classification Search
CPC ............ H04B 7/18578; H04B 7/18502; H04B 7/0617; H04B 1/40; H04W 72/046
See application file for complete search history.

(56) References Cited

U.S. PATENT DOCUMENTS

| | | | | |
|---|---|---|---|---|
| 9,964,637 | B1* | 5/2018 | Winters | G01S 13/66 |
| 2013/0070677 | A1* | 3/2013 | Chang | G01S 13/9303 370/328 |
| 2016/0156409 | A1* | 6/2016 | Chang | H04W 4/90 370/315 |
| 2016/0226570 | A1* | 8/2016 | Nicholls | H01Q 1/246 |
| 2017/0029107 | A1* | 2/2017 | Emami | B64C 39/024 |

\* cited by examiner

*Primary Examiner* — Clemence S Han
(74) *Attorney, Agent, or Firm* — FisherBroyles, LLP

(57) ABSTRACT

Systems and associated methods for adaptive beam aggregation in wireless communications between unmanned aerial vehicles (UAVs) and ground-based stations are disclosed herein. In some embodiments, a method for transmitting wireless data between an unmanned aerial vehicle (UAV) and a customer premise equipment (CPE) station includes transmitting a first wireless data between a first antenna array and a first CPE station and transmitting a second wireless data between a second antenna array and a second CPE station. The first and second antenna arrays can include one or more individual antennas of the UAV.

28 Claims, 7 Drawing Sheets

US 10,355,777 B2

ADAPTIVE BEAM AGGREGATION AND SPLIT TRANSCEIVER IN UNMANNED VEHICLES

CROSS-REFERENCES TO RELATED APPLICATIONS

This application claims the benefit of U.S. Provisional Patent Application Ser. No. 62/376,229, filed on Aug. 17, 2016, and entitled "ADAPTIVE BEAM AGGREGATION AND SPLIT TRANSCEIVER IN UNMANNED VEHICLES," the disclosure of which is hereby incorporated by reference in its entirety.

TECHNICAL FIELD

The present technology is generally related to the field of transmitting/receiving wireless signals, e.g., between unmanned aerial vehicles (UAVs) and ground-based stations.

BACKGROUND

Wireless communication systems transfer signals from a transmitter (TX) of one station to a receiver (RX) of another station. In some applications, one of the stations can be ground-based (i.e., stationary) while the other station can be carried by a flying object (e.g., a satellite in Earth's orbit or an airplane). In some applications, multiple stations (TX or RX) can be ground-based and in communication with one or more flying objects (RX or TX). Such systems can be used for providing Internet connectivity, e.g., in regions where providing Internet connectivity via a land-based network is underdeveloped. The airborne RX/TX can be carried by unmanned airborne vehicles (UAVs) that fly over the ground-based stations within an assigned area. The land-based stations can include a customer premise equipment (CPE) station belonging to telecom companies that provide internet connectivity to their customers.

In some applications, areal distribution of the CPE stations can be uneven. For example, a large number of CPE stations may be clustered within a relatively small area, while few CPE stations may be distributed over a large area. Additionally, different CPE stations may be associated with different data bandwidths. For example, some CPE stations may be associated with signal throughputs in multi-gigabit per second (Gbps), while some others may be associated with signal throughputs in megabit per second (Mbps). As a result, the UAV may service areas on the ground having significantly different data throughputs.

In some conventional technologies, one or more "buffer" UAVs can be added to absorb the surges in the bandwidth (e.g., data throughput) demand. Alternatively, additional equipment (e.g., transceivers, antennas, power supplies, etc.) may be added to the existing UAVs to service temporary surges in the bandwidth needed. However, doing so increases the price and decreases the utilization of the UAV equipment. Furthermore, the size, weight and power specifications of the additional equipment may exceed the available capacity of the UAVs, especially for the solar powered UAVs. Accordingly, it can be advantageous to have airborne systems that are robust, economical, and capable of providing variable TX/RX data throughputs to meet the variable demands of different CPE stations.

DETAILED DESCRIPTION

Figure 1:
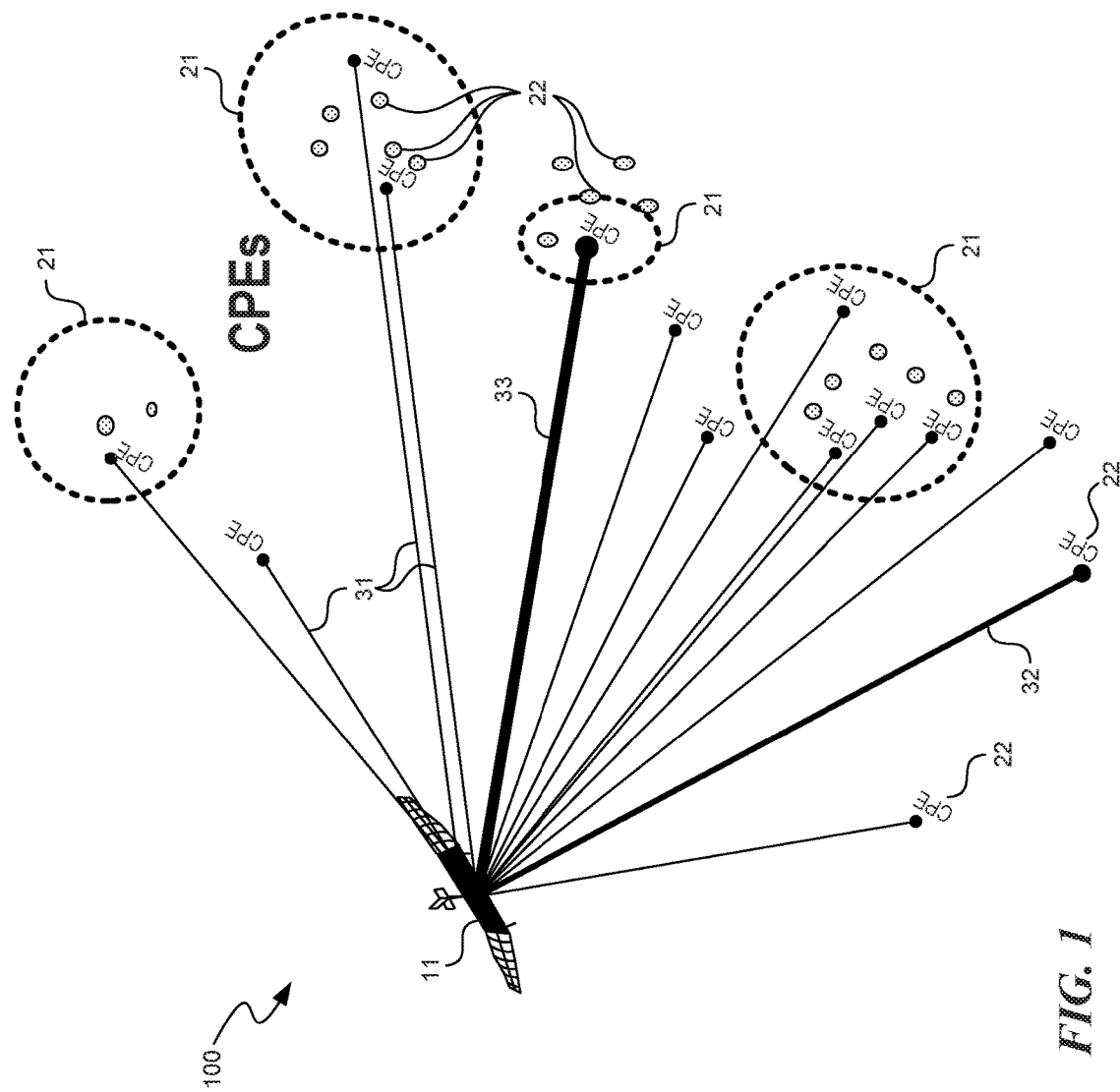
FIG. 1 is a schematic representation of an unmanned aerial vehicle (UAV) in wireless communication with multiple customer premise equipment (CPE) stations in accordance with various embodiments.

The following disclosure describes various embodiments of systems and associated methods for transmitting wireless signals between a customer premise equipment (CPE) station on the ground and an airborne unmanned aerial vehicle (UAV). In some embodiments, a broadband communication via High Altitude Platform Point-to-Multipoint Link (HAP-PTMP) in which a HAP can be a UAV capable of achieving low cost/high bandwidth wireless communication with one or more ground-based CPE stations. The UAV-based broadband communication can be especially useful in areas where ground-based fiber networks are underdeveloped. Furthermore, the bandwidth(s) associated with the CPE stations can vary widely, and can also rapidly change. The disclosed UAV-based communication system addresses these issues.

In some embodiments, antennas of a UAV can be divided into multiple antenna arrays, each capable of communicating with one or more CPE stations. For example, one antenna array may transmit data to one CPE station at a first frequency (e.g., within the Ka band), while another antenna array may receive data from another CPE station at a second frequency (e.g., within the C frequency band). In some embodiments, each individual antenna of the antenna array may be connected to its respective power amplifier (PA) or low noise amplifier (LNA), depending on whether the antenna array operates in a download (DL) or an upload (UL) mode. In the DL mode, the transmitters (TXs) of the UAV transmit data from the UAV to the CPE station. In the UL mode, the receivers (RXs) of the UAV receive data from the CPE station. When an antenna array is not used, the corresponding PAs and/or LNAs may be turned off to save power.

In some embodiments, the antenna arrays may be reconfigured to dedicate a larger or a smaller number of individual antennas to a particular antenna array, depending, for example, on the bandwidth that the antenna array is expected to provide. Thus, the antenna of a UAV can include multiple antenna arrays that operate at different frequencies (e.g., within the Ka band or the C band), at different times (e.g., being able to be powered on/off as needed), and having different configurations (e.g., using an optimum number of the individual antennas included in the antenna array). Furthermore, the same antenna array may use different frequencies to communicate with the CPE stations, e.g., operating in a frequency domain division (FDD) mode. In some embodiments, the same antenna array may wirelessly communicate with one CPE station in one period of time, and wirelessly communicate with a different CPE station in another period of time (e.g, operating in a time domain division (TDD) mode).

In some embodiments, the individual antennas of the antenna array can be combined to operate as a phased array antenna to, for example, improve the targeting of the CPE stations. The individual antennas may share common resources (e.g., local oscillator, controller, power management module, etc.) to reduce the weight and cost of the overall system. In some embodiments, multiple UAVs can be used to, for example, pool the antennas into larger antenna arrays.

Various embodiments of the inventive technology are set forth in the following description and Figures. Many of the details and features shown in the Figures are merely illustrative of particular embodiments of the disclosure and may not be drawn to scale. Accordingly, other embodiments can have other details and features without departing from the spirit and scope of the present disclosure. In addition, those of ordinary skill in the art will understand that further embodiments can be practiced without several of the details described below. Some details describing well-known structures and systems often associated with wireless signal systems are not set forth below to avoid unnecessarily obscuring the description of the various embodiments of the disclosure. Furthermore, various embodiments of the disclosure can include structures other than those illustrated in the Figures and are expressly not limited to the structures shown in the Figures.

FIG. 1 is a schematic representation of a UAV 11 in wireless communication with multiple CPE stations in accordance with various embodiments. Some CPE stations 22 may be grouped within a relatively small area 21, thereby presenting a relatively large number of individual RX/TX targets for antennas of the UAV. On the other hand, depending on a particular geographical distribution of the telecom companies' customers, some CPE stations 22 may be spaced apart over a larger area. As a result, the UAV 11 may service a small number of the CPE stations 22 within a large area, or a large number of the CPE stations 22 within a small area. Furthermore, some CPE stations 22 may be associated with signal throughputs in multi-gigabit per second (Gbps), while some others may be associated with signal throughputs in megabit per second (Mbps). For example, a data link 33 may represent a multi-Gbps throughput between the UAV 11 and the CPE station, while a data link 32 represents a medium throughput between the UAV 11 and the CPE station, and a data link 31 represents a smaller throughput, e.g., in the Mbps range. Additionally, the throughputs associated with the CPE stations can change in real time, e.g., a small bandwidth specification associated with a CPE station 22 may change relatively quickly into a large bandwidth specification, and vice versa.

Figure 2:
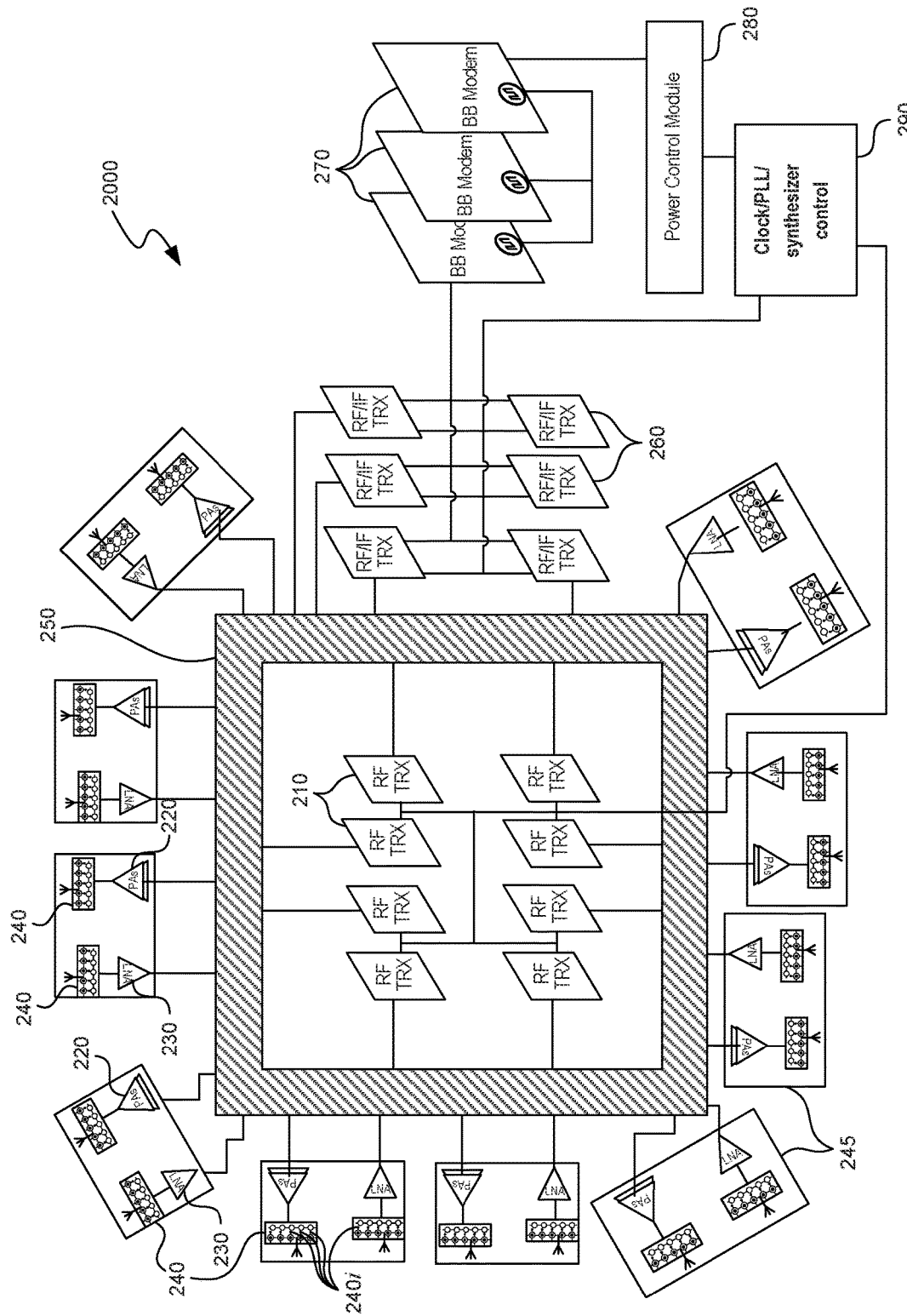
FIG. 2 is a schematic illustration of a wireless data transmission system in accordance with various embodiments.

FIG. 2 is a schematic illustration of a wireless data transmission system 2000 in accordance with various embodiments. For example, the system 2000 can be carried by a solar powered UAV that flies over an assigned land area which includes multiple CPE stations. The system 2000 can include multiple panels 245, each having antenna arrays 240 connected to PAs 220 or LNAs 230, depending on the direction of the wireless data transfer for a particular antenna array (e.g., PAs for DL or LNAs for UL data transfer). In some embodiments, the antenna arrays 240 include multiple individual antennas 240i. The number of the individual antennas 240i in the antenna array can depend on the bandwidth associated with a CPE. Therefore, in some embodiments, an antenna array 240 is configured prior to establishing wireless communication with the CPE. In some embodiments, an antenna array 240 may be re-configured to include a smaller number or a larger number of the individual antennas 240i when, for example, the bandwidth associated with a CPE changes, or the antenna array exchanges wireless data with another CPE. In some embodiments, the antenna arrays 240 can be formed from the individual antennas 240i carried by different panels 245. For example, an antenna array 240 may include the individual antennas 240i from two or more adjacent panels 245.

In some embodiments, the antenna arrays 240 can be connected to radio frequency transceivers (RF TRXs) 210 through a switch matrix 250. For example, signals from the RF TRX 210 can be routed through the switch matrix 250 to the PAs and/or LNAs of one or more panels 245. Depending on a particular configuration of the antenna arrays (e.g., the number of individual antennas 240i included in the antenna array), one RF TRX 210 may support multiple antenna arrays 240. In some other configurations, multiple RF TRXs 210 may support a single antenna array 240, e.g., when the antenna array 240 includes a relatively large number of the individual antennas 240i. In some embodiments, the switch matrix may connect the individual antennas 240i of a newly formed antenna to the TRXs 210 to carry the reconfiguration of the antenna array.

In some embodiments, the RF TRXs 210 may be connected to one or more radio frequency/intermediate frequency transceivers (RF/IF TRXs) 260. For example, in some embodiments, the RF/IF TRXs 260 may provide a signal at low frequency, followed by mixing the signal with an output from a local oscillator, and then the resulting signal is frequency-shifted to one of the frequency bands within, e.g., C band or Ka band. In some embodiments, the synchronization between the RF/IF TRXs 260 and the RF TRXs 210 can be provided by a control board 290 that includes a common clock, a phase control loop (PLL) and a synthesizer.

In some embodiments, baseband modems 270 may provide baseband signals at a relatively low frequency to the RF/IF TRXs 260. The baseband modems 270 can be synchronized through the control board 290, which can also provide synchronization (e.g., through a common clock) to the RF/IF TRXs 260 and RF TRXs 210. In some embodiments, the system 2000 may include a power control module 280. For example, when some of the antenna arrays 240 are not used (e.g., not communicating with the CPEs), the power control module 280 may switch off power to the PAs/LNAs of the non-used antenna arrays. Conversely, if the antenna array 240 transmits signals at high bandwidth or at high amplification, the power control module 280 may increase power delivery to the PAs of the antenna array to prevent signal clipping.

Figure 3:
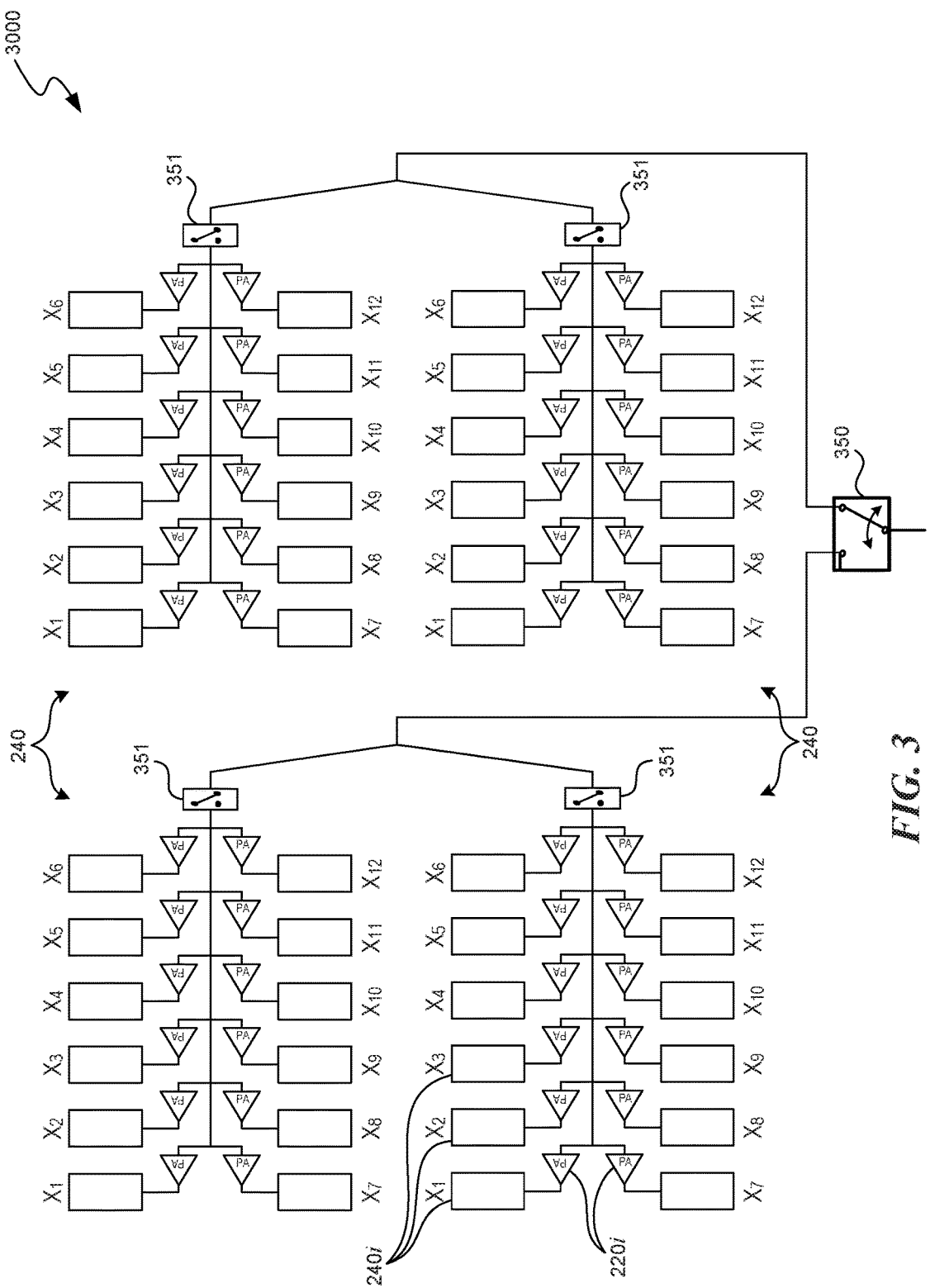
FIG. 3 is a schematic illustration of antenna arrays in accordance with various embodiments.

FIG. 3 is a schematic illustration of the antenna array system 3000 in accordance with various embodiments. The system 3000 includes four antenna arrays 240, however other numbers of the antenna arrays are also possible. The antenna arrays can be part of one or more panels 245 (not shown in FIG. 3) that are carried by a UAV. Each antenna array 240 includes 12 individual antenna 240i (e.g., the individual antennas X1-X12), but other configurations of the antenna arrays are also possible. For example, in some embodiments it may be advantageous to design an antenna array 240 such that the number of the individual antennas 240i in the antenna array 240 corresponds to a power of 2 (e.g., 8, 16, 256, 512, etc. antenna elements). The individual antennas 240*i* may be connected to their corresponding PAs for the DL data transmission or to the LNAs for the UL data transmission.

The antenna arrays 240 may be connected to array switches 351 that turn off the PAs of the antenna array 240 when, for example, the antenna array is not used. In some embodiments, the antenna arrays 240 can wirelessly communicate (e.g., in the UL or DL mode) with different CPEs on the ground. In some embodiments, multiple antenna arrays 240 can communicate with one CPE to, e.g., satisfy increased demand for bandwidth by the CPE. An antenna switch 350 may also turn off the PAs of multiple antenna arrays 240.

Figure 4:
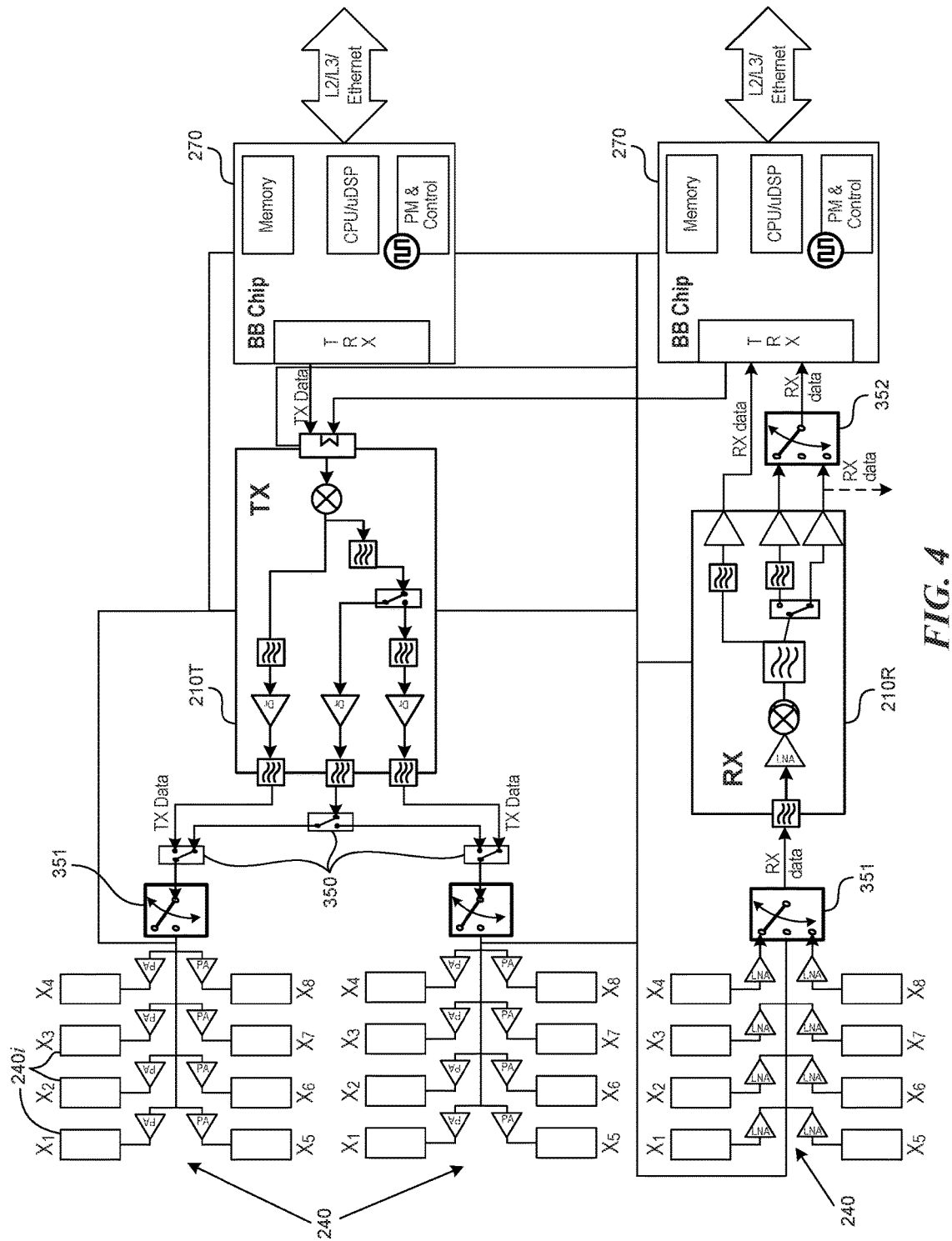
FIG. 4 is a schematic illustration of a wireless data transmission system in accordance with various embodiments.

FIG. 4 is a schematic illustration of a wireless data transmission system in accordance with various embodiments. In some embodiments, the system can include a TX 210T and an RX 210R, each connected to one or more antenna arrays 240 through the switches 350 and/or 351. In some embodiments, the switches 350 and/or 351 may be included in the switch matrix 250 (not shown). The individual antennas 240*i* (e.g., the individual antennas X1-X8) can be connected to their corresponding PAs, and further to the TX 210T. Conversely, the individual antennas 240*i* that are connected to their corresponding LNAs may be further connected to the RX 210R through, e.g., the switch 351. In some embodiments, the individual antennas of the antenna arrays 240 may be configured to operate as a phased array antenna.

The TX 210T can receive TX data (e.g., payload data) from a baseboard 270. In some embodiments, the TX data can be modulated with a local oscillator signal in a mixer, filtered, and frequency-shifted to a frequency band (e.g., within the C band or Ka band) for the DL data transfer. In some embodiments, the two antenna arrays 240 that are connected to the TX 210T may operate at different frequencies (e.g., one in the C band, the other in the Ka band) and may be in wireless communication with different CPE stations. Depending on the data throughput demand of different CPE stations, a given antenna array 240 may communicate with different CPE stations at the same frequency, but at different times (e.g., in the TDD mode). Furthermore, based on the bandwidth needs of the ground-based CPEs, one or more of the antenna arrays may be selectively turned off, or may be combined into smaller numbers or larger numbers of the antenna arrays.

In some embodiments, the RX 210R receives RX data from the LNAs, filters, and frequency-shifts the data to a lower frequency band, and modulates the RX data with the local oscillator. In some embodiments, the RX 210R sends the RX data (e.g., voice data, video data, etc.) to the baseboard 270, either directly or through a switch 352.

In some embodiments, the baseboard 270 can include a baseboard chip, memory, CPU and/or DSP, power control module, and a controller. In some embodiments, one baseboard 270 may be connected to both TX 210T and RX 210R. When not in use, the TX and/or RX may be turned off to reduce energy consumption. In some embodiments, the TX and/or RX may be connected to Ethernet of the UAV.

Figure 5:
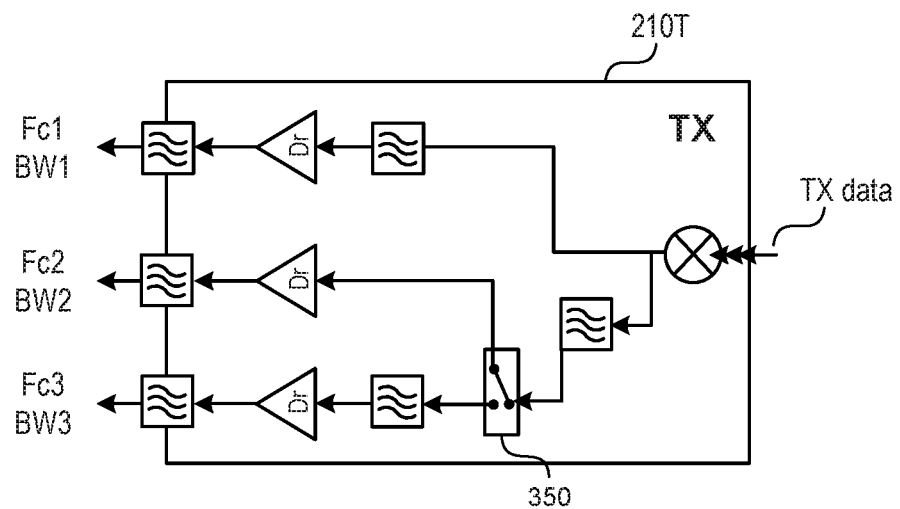
FIG. 5 is a schematic illustration of a transceiver (TX) in accordance with various embodiments.
Figure 6:
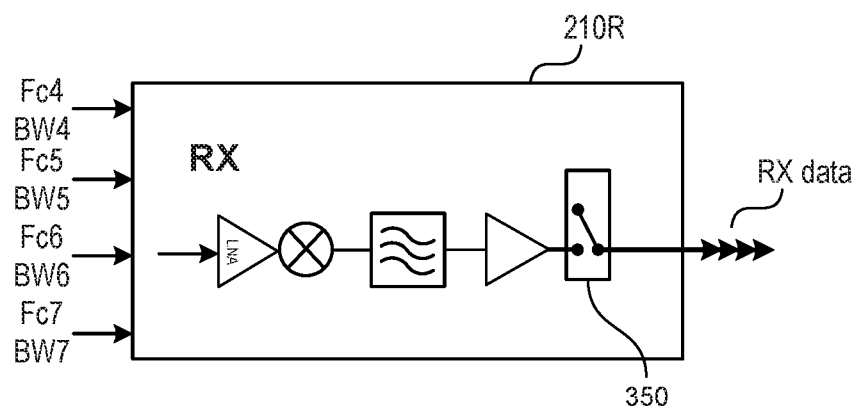
FIG. 6 is a schematic illustration of a receiver (RX) in accordance with various embodiments.

FIGS. 5 and 6 illustrate example embodiments of the TX and RX. FIG. 5 is a schematic illustration of the TX 210T in accordance with various embodiments. In some embodiments, the TX 210T may receive the TX data from the baseboard 270 (not shown). In the illustrated embodiment, the TX 210T distributes the incoming stream of the TX data into three data streams, but other number of data streams is also possible using, for example, one or more switches 350. In some embodiments, the data streams are modulated to different frequencies and bandwidths. For example, the three data streams can be modulated to frequencies/bandwidths Fc1/BW1, Fc2/BW2 and Fc3/BW3, and fed to their respective antenna arrays 240 (not shown). In some embodiments, the frequencies Fc1-Fc3 may belong to different frequency bands, for example Fc1 and Fc2 being within the C band, and Fc3 being within the Ka band.

FIG. 6 is a schematic illustration of the RX 210R in accordance with various embodiments. The illustrated RX 210R may receive four incoming data streams at the frequencies/bandwidths Fc4/BW4-Fc7/BW7. In some embodiments, the RX 210R can combine the incoming data streams into an outgoing RX data that is sent to the baseboard 270 (not shown). In some embodiments, the incoming data streams may be combined into two or more outgoing streams for RX data.

Figure 7:
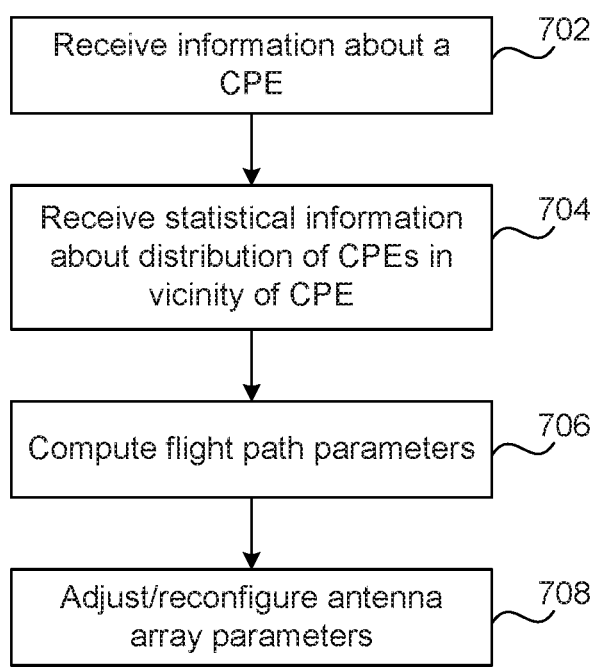
FIG. 7 is a process associated with reconfiguring the antenna arrays in accordance with various embodiments.

FIG. 7 is a flow diagram illustrating a process 700 associated with reconfiguring the antenna arrays in accordance with various embodiments. Process 700 begins at block 702 and continues to block 708. In some embodiments, the process 700 can be performed by a transceiver included in a UAV. At block 702, a UAV receives information about a CPE. In some embodiments, this information can be registration information associated with a CPE. The registration information can be received from the CPE, or from another CPE that is part of the PTMP network. In some implementations, the registration information can be received from another UAV or retrieved from a database remotely located from the UAV. The registration information can include a name, a network address such as an IP or a MAC address, a location, and communication capabilities/specifications of the CPE. The communication capabilities can include a type of modem coupled to the CPE, modulation/coding formats supported by the CPE, and/or a desired data throughput specification. In some implementations, the communication capabilities can also include channel state information of the UL channel between the CPE and the UAV. At block 704, the UAV computes or otherwise receives statistical information about a geographical distribution of CPEs in a vicinity of the CPE. For example, the statistical information can be a density of CPEs distributed in an area surrounding or bordering the CPE. The statistical information can be received from a central ground-based or areal station. At block 706, the UAV computes parameters of its flight path/trajectory in relation to the CPE. The flight path parameters can include a direction and a magnitude of the UAV's velocity, location (azimuth/elevation) angles of the UAV's position with respect to the CPE, a magnitude and direction of the UAV's acceleration, a Doppler shift in frequency caused due to the motion of the UAV with respect to the CPE, and other such parameters. In some implementations, the UAV also obtains weather-related information that can impact the wireless link between the UAV and the CPE. At block 708, the UAV adjusts the parameters of its antenna array based on any combination of the registration information, the statistical information, the flight path parameters, or the weather-related information. For example, in good weather, the antenna array can save power by not using a high gain beam. However, under poor weather conditions, a high gain beam might be needed. As another example, the UAV may determine the number of antenna arrays (e.g., to be concurrently used) for communicating with a CPE, e.g., to support the bandwidth specifications of the CPE. Adjusting antenna array parameters includes determining whether a narrow or a wide beam is to be used for communications, position(s) of the antenna panel(s) with respect to the CPE, gains of the antenna array(s), and/or the amount of transmit power.

In some implementations, adjusting the antenna array parameters of the UAV includes reconfiguring them. Adjustments to the antenna array parameters can occur in real time, e.g., as any of the registration information, the statistical information, the flight path parameters, or the weather-related information gets updated. Also, all the parameters of the antenna are not necessarily adjusted at the same time. Thus, some parameters such as frequency of transmission, timing delays, etc. are adjusted on a slower time scale than parameters such as beam width, beam shape, and a duty cycle or schedule of the beam as it is cycled among multiple CPEs.

Table 1 illustrates a distribution of data transmission frequencies in accordance with various embodiments. In some embodiments, antennas (or, antenna arrays) at the CPE and/or a UAV can transmit/receive at different frequencies. For example, the spectrum can be divided into different frequency bands for transmission/reception by different antenna arrays or different panels/portions of the same antenna array. A person of ordinary skill would understand that other distributions of data transmission frequencies are also possible in accordance with the present technology. In Table 1, rows 2 and 3 correspond to the C band, and rows 4-8 correspond to the Ka band.

TABLE 1

| 1 | | Frequency (GHz) | Basic beams (MHz) | Beam frequency aggregation scales (MHz) | # Basic beam + Polarization Aggregation (2) |
|---|---|---|---|---|---|
| 2 | C:DL | 6.440-6.520 | 4 × 20 | 20, 40, 60, 80 | 2 × 4 |
| 3 | C:UL | 6.560-6.640 | 8 × 10 | 10-80 | 2 × 8 |
| 4 | Ka:DL | 27.5-28.34 | 8 × 20 | 20-160 | 2 × 20 |
| 5 | | 27.9-28.2 | 15 × 20 | 20-300 | 2 × 15 |
| 6 | | 26.25-28.25 | 100 × 20 | 20-2000 | 2 × 100 |
| 7 | Ka:UL | 31.0-31.3 | 30 × 10 | 10-300 | 2 × 30 |
| 8 | | 21.4-22.0 | 60 × 10 | 10-600 | 2 × 60 |

For example, row 3 indicates that the UL frequencies reserved in the C band are included in the interval 6.56 GHz-6.64 GHz. If the frequency bandwidth is 10 MHz, then the frequencies from 6.56 GHz to 6.64 GHz can be divided into eight bands, i.e., into eight basic beams. In some embodiments, each basic beam may be emitted from one or more CPE stations on the ground to the antenna array 240 (i.e., in the UL mode of operation). In some embodiments, the available frequency bands may be aggregated in any manner covering frequencies between 10 MHz and 80 MHz in increments of 10 MHZ (e.g., the bandwidth of the basic beam). For example, the available bandwidth of 80 MHz may be allocated to two antenna arrays 240, one using 60 MHz of bandwidth to communicate with the CPE having greater bandwidth specification, and the other antenna array 240 using the remaining 20 MHz of bandwidth to communicate with the CPE associated with lesser bandwidth specification. Other allocations of the bandwidth are also possible. In some embodiments, in addition to using multiple basic beams within the 6.56 GHz to 6.64 GHz frequency band, the basic beams may also be polarized. For example, having two perpendicularly polarized RF beams can double the count of available basic beams. Therefore, the number of basic beams available for aggregation will become 16 for the polarized beams.

In the example shown in row 5, the Ka band from 27.9 GHz to 28.2 GHz may be allocated for transmitting data from the antenna arrays of the UAV to one or more CPEs on the ground. If the basic beams have a bandwidth of 20 MHz, then the total available bandwidth of 300 MHz may be divided into a maximum of 15 beams. Therefore, in some embodiments, up to 15 antenna arrays 240 can transmit data to the CPEs, each antenna array 240 being allocated 20 MHz bandwidth within the Ka band. In some embodiments, the 20 MHz bands may be aggregated into wider bandwidth, e.g., three bandwidths of 100 MHz each for three antenna arrays 240. If the antenna arrays 240 emit polarized beams, then the total number of available frequency bands would then become 30 (i.e., 2×15), for the illustrated example.

Figure 8:
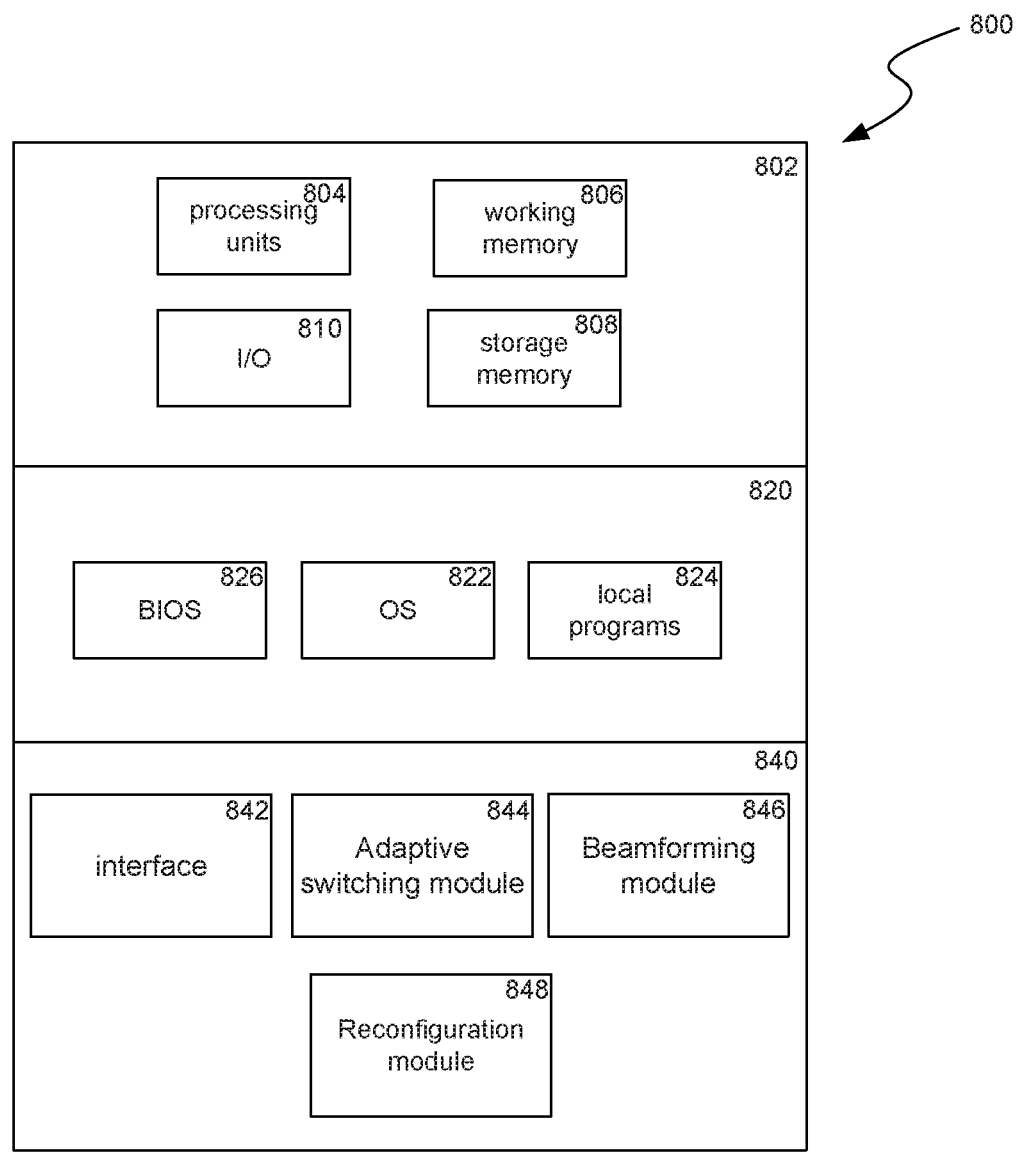
FIG. 8 is a block diagram illustrating components included in a system employing the disclosed technology.

FIG. 8 is a block diagram illustrating components 800 which, in some implementations, can be used in a system employing the disclosed technology. In some embodiments, the components 800 can be included in a UAV. The components 800 include hardware 802, general software 820, and specialized components 840. As discussed above, a system implementing the disclosed technology can use various hardware including processing units 804 (e.g. CPUs, GPUs, APUs, etc.), working memory 806, storage memory 808 (local storage or as an interface to remote storage), and input and output devices 810. In various implementations, storage memory 808 can be one or more of: local devices, interfaces to remote storage devices, or combinations thereof. For example, storage memory 808 can be a set of one or more hard drives (e.g. a redundant array of independent disks (RAID)) accessible through a system bus or can be a cloud storage provider or other network storage accessible via one or more communications networks (e.g. a network accessible storage (NAS) device. Components 800 can be implemented in a client computing device such as client computing devices 805 or on a server computing device.

General software 820 can include various applications including an operating system 822, local programs 824, and a basic input output system (BIOS) 826. Specialized components 840 can be subcomponents of a general software application 820, such as local programs 824. Specialized components 840 can include adaptive switching module 844, beamforming module 846, and reconfiguration module 848, and components which can be used for transferring data and controlling the specialized components, such as interface 842. In some implementations, components 800 can be in a computing system that is distributed across multiple computing devices or can be an interface to a server-based application executing one or more of specialized components 840.

Adaptive switching module 844 is configured to operate distributed antenna apertures and/or phased arrays on the UAV. For example, the adaptive switching module 844 can electrically control aperture partitioning and switching of apertures. In some embodiments, the adaptive switching module 844 can reduce the restriction of number of apertures and maximize the TX power efficiency. The adaptive switching module 844 also enables sharing frequency and antenna and TRX link channel resources. In some embodiments, the adaptive switching module 844 can facilitate baseband multi-carrier aggregation and/or analog/IF multi-carrier aggregation.

Beamforming module 846 allows individual antenna elements included in an antenna array at a UAV to be combined to generate directional beams that maximize the transmit energy and receive sensitivity of an antenna array in a specific direction, thereby concentrating the power to an intended CPE. As a result, signals from an antenna array directed at particular angles to a ground station experience constructive interference whereas the same signal at other ground stations experience destructive interference.

Reconfiguration module 848 can reconfigure the frequency, spectrum, number of antennas, timing delays and other transceiver attributes. For example, the reconfiguration module 848 can dedicate a larger or a smaller number of individual antenna elements included in a particular antenna array. Adjusting antenna array parameters includes determining whether a narrow or a wide beam is to be used for communications, position(s) of the antenna panel(s) with respect to the CPE, gains of the antenna array(s), and/or the amount of transmit power. Reconfiguration module can provide resource sharing/allocation functionality in full duplex UL/DL system for geographic selective space (SDMA), frequency (FDMA), and time (TDMA) multiple accesses by CPEs.

From the foregoing, it will be appreciated that specific embodiments of the invention have been described herein for purposes of illustration, but that various modifications may be made without deviating from the spirit and scope of the various embodiments of the invention. For example, in some embodiments, the wireless signals may be transmitted between two or more UAVs instead of or in addition to between a single UAV and the CPEs. Furthermore, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

We claim:

1. A method for transmitting wireless data between an unmanned aerial vehicle (UAV) and a customer premise equipment (CPE) station, the method comprising:
    transmitting a first wireless data between a first antenna array and a first CPE station, wherein the first antenna array includes one or more individual antennas of the UAV; and
    transmitting a second wireless data between a second antenna array and a second CPE station, wherein the second antenna array includes one or more individual antennas of the UAV, and
    wherein one or more individual antennas of the UAV are dynamically added to or removed from the first or second antenna arrays according to one or more parameters affecting communication between the UAV and the first and/or second CPE stations.

2. The method of claim 1 wherein:
    transmitting the first wireless data includes transmitting a download (DL) wireless data from a transmitter (TX) of the UAV to a receiver (RX) of the first CPE station; and
    transmitting the second wireless data includes transmitting an upload (UL) wireless data from a TX of the second CPE station to an RX of the UAV.

3. The method of claim 2 wherein:
    the individual antennas of the first antenna array are connected to corresponding power amplifiers (PAs); and
    the individual antennas of the second antenna array are connected to corresponding low noise amplifiers (LNAs).

4. The method of claim 3, further comprising:
    connecting the PAs and LNAs to their respective RX and TX through a switch matrix.

5. The method of claim 4, further comprising:
    connecting the common transmitter TX to a first baseband (BB) component, and
    connecting the common receiver RX to a second BB component.

6. The method of claim 3 wherein:
    transmitting the first wireless data includes transmitting through a common transmitter (TX); and
    transmitting the second wireless data includes receiving by a common receiver (RX).

7. The method of claim 6 wherein the common receiver RX and the common transmitter TX are components of a same transceiver (TRX).

8. The method of claim 1 wherein:
    transmitting the first wireless data includes transmitting at a first frequency; and
    transmitting the second wireless data includes transmitting at a second frequency.

9. The method of claim 8 wherein the first frequency is in a C band, and the second frequency is in a Ka band.

10. The method of claim 1, further comprising:
    transmitting a third wireless data between a third antenna array and a third CPE station, wherein the third antenna array includes one or more individual antennas of the UAV.

11. The method of claim 10 wherein the first antenna array and the third antenna array are connected to a common TX.

12. The method of claim 10 wherein:
    transmitting the first wireless data includes transmitting at a first frequency, and
    transmitting the third wireless data includes transmitting at a third frequency.

13. The method of claim 10 wherein the first CPE and the third CPE are collocated.

14. The method of claim 1, further comprising:
    powering down the first antenna array after transmitting the first wireless data between the first antenna array and the first CPE station.

15. The method of claim 1, further comprising:
    at least partially reconfiguring the individual antennas of the first and second antenna arrays into a common antenna array in wireless communication with at least one CPE station.

16. The method of claim 1 wherein the first antenna array is a phased array antenna.

17. The method of claim 1 wherein the UAV is a first UAV, the method further comprising:
    transmitting a third wireless data between an antenna array of a second UAV and a third CPE station, wherein the antenna array of a second UAV includes one or more individual antennas of the second UAV.

18. The method of claim 1 wherein the UAV is a first UAV, and wherein the first antenna array is implemented in conjunction with one or more individual antennas of a second UAV as part of a combined antenna array that includes antenna arrays on each of the first and second UAVs.

19. A system for transmitting wireless data between an unmanned aerial vehicle (UAV) and a customer premise equipment (CPE) station, comprising:
    a first antenna array carried by the UAV, the first antenna array including one or more individual antennas of the UAV; and a second antenna array carried by the UAV, the second antenna array including one or more individual antennas of the UAV, wherein the first antenna array is configured to wirelessly exchange data with a first customer premise equipment (CPE) station, and the second antenna array is configured to wirelessly exchange data with a second customer premise equipment (CPE) station, and wherein one or more individual antennas of the UAV are dynamically added to or removed from the first or second antenna arrays according to one or more parameters affecting communication between the UAV and the first and/or second CPE stations.

20. The system of claim 19, further comprising:
individual power amplifiers (PAs) connected to the individual antennas of the first antenna array,
individual low noise amplifiers (LNAs) connected to the individual antennas of the second antenna array.

21. The system of claim 20, further comprising:
a transmitter (TX) connected to the individual power amplifiers (PAs) of the first antenna array; and
a receiver (RX) connected to the individual low noise amplifiers (LNAs) of the second antenna array.

22. The system of claim 21 wherein the TX and the RX are part of a transceiver (TRX) unit, the system further comprising a switch matrix connecting the TRX to the PAs of the first antenna array and the LNAs of the second antenna array.

23. The system of claim 19, further comprising:
a third antenna array carried by the UAV, the third antenna array including one or more individual antennas of the UAV, wherein the third antenna array is configured to wirelessly exchange data with a third customer premise equipment (CPE) station.

24. The system of claim 23 wherein:
the first antenna array is configured to transmit download (DL) data to the first CPE station;
the second antenna array is configured to receive upload (UL) data from the second CPE station; and
the third antenna array is configured to transmit download (DL) data to the third CPE station.

25. The system of claim 24 wherein:
the first antenna array is configured to operate at a first frequency;
the second antenna array is configured to operate at a second frequency; and
the third antenna array is configured to operate at a third frequency.

26. The system of claim 25 wherein:
the first and third frequencies are in a Ka band, and
the second frequency is in a C band.

27. The system of claim 19, further comprising an on/off switch connected to the first antenna array.

28. The system of claim 19 wherein the first antenna array is a phased array antenna.

* * * * *